United States Patent
Yoon et al.

(10) Patent No.: US 10,679,028 B2
(45) Date of Patent: Jun. 9, 2020

(54) METHOD AND APPARATUS FOR PERFORMING AUTHENTICATION BASED ON BIOMETRIC INFORMATION

(71) Applicant: Samsung Electronics Co., Ltd., Suwon-si, Gyeonggi-do (KR)

(72) Inventors: Kangjin Yoon, Seoul (KR); Sujung Kang, Suwon-si (KR); Jonghan Park, Bucheon-si (KR); Duckey Lee, Seoul (KR); Hyewon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 15/959,927

(22) Filed: Apr. 23, 2018

(65) Prior Publication Data

US 2018/0307888 A1 Oct. 25, 2018

(30) Foreign Application Priority Data

Apr. 24, 2017 (KR) ........................ 10-2017-0052480

(51) Int. Cl.
*G06K 9/00* (2006.01)
*H04L 9/08* (2006.01)
*H04L 29/06* (2006.01)
*H04L 9/32* (2006.01)

(52) U.S. Cl.
CPC ..... *G06K 9/00026* (2013.01); *G06K 9/00073* (2013.01); *H04L 9/0825* (2013.01); *H04L 9/0866* (2013.01); *H04L 9/3231* (2013.01); *H04L 63/0861* (2013.01)

(58) Field of Classification Search
CPC ........... G06K 9/00026; G06K 9/00073; G06K 9/0008; G06K 9/00093; H04L 9/0825; H04L 9/0866; H04L 9/3231; H04L 63/0861
USPC ........................................................ 382/125
See application file for complete search history.

(56) References Cited

U.S. PATENT DOCUMENTS

| | | | |
|---|---|---|---|
| 2001/0026636 A1 | 10/2001 | Mainguet | |
| 2010/0046810 A1* | 2/2010 | Yamada | G06K 9/00026 382/124 |
| 2010/0119061 A1 | 5/2010 | Kawale | |
| 2012/0030743 A1* | 2/2012 | Semba | G06F 21/32 726/7 |

(Continued)

FOREIGN PATENT DOCUMENTS

| | | |
|---|---|---|
| EP | 2813961 B1 | 8/2016 |
| WO | 2005/008568 A1 | 1/2005 |

OTHER PUBLICATIONS

International Search Report dated Aug. 10, 2018 issued in PCT Application PCT/KR2018/004691.

(Continued)

*Primary Examiner* — Ali Bayat
(74) *Attorney, Agent, or Firm* — Jefferson IP Law, LLP

(57) ABSTRACT

A method of operating a terminal is provided. The method includes obtaining first partial fingerprint information, obtaining second partial fingerprint information, generating combination fingerprint information based on the first partial fingerprint information and the second partial fingerprint information, transmitting the combination fingerprint information to a server, and receiving an authentication result of the combination fingerprint information from the server.

16 Claims, 16 Drawing Sheets

(56) References Cited

U.S. PATENT DOCUMENTS

| | | |
|---|---|---|
| 2013/0290502 A1* | 10/2013 | Bilobrov ................ G06F 21/10 |
| | | 709/223 |
| 2013/0329967 A1 | 12/2013 | Abiko |
| 2014/0003678 A1* | 1/2014 | Vieta ................ G06K 9/00026 |
| | | 382/124 |
| 2014/0003679 A1 | 1/2014 | Han et al. |
| 2014/0337635 A1 | 11/2014 | Konvalinka |
| 2015/0358317 A1 | 12/2015 | Deutschmann et al. |
| 2016/0203354 A1 | 7/2016 | Choi et al. |
| 2016/0350574 A1 | 12/2016 | Weber et al. |
| 2017/0017825 A1 | 1/2017 | Choi et al. |
| 2017/0039410 A1 | 2/2017 | Pi |

OTHER PUBLICATIONS

European Search Report dated Apr. 7, 2020, issued in European Application No. 18790062.6-1207/3596645.

* cited by examiner

METHOD AND APPARATUS FOR PERFORMING AUTHENTICATION BASED ON BIOMETRIC INFORMATION

CROSS-REFERENCE TO RELATED APPLICATION(S)

This application is based on and claims priority under 35 U.S.C. § 119(a) of a Korean patent application number 10-2017-0052480, filed on Apr. 24, 2017, in the Korean Intellectual Property, the disclosure of which is incorporated by reference herein in its entirety.

TECHNICAL FIELD

The disclosure relates to an authentication method, an apparatus, and a system based on biometric information. More importantly, the disclosure relates to a method, an apparatus, and a system for authenticating a user or user information using some of biometric information.

BACKGROUND

Electronic devices, such as a smart phone, have been rapidly developed and include various functions. With the development of electronic devices, various functions for security and authentication are added to mobile electronic devices and wearable electronic devices. For example, technologies increase that strengthen security of an electronic device using various methods, such as fingerprint recognition, facial contour recognition, iris recognition, and voice recognition and that provide security and authentication services using an electronic device.

Technology using biometric information, such as fingerprint recognition technology is widely used in fields, such as lock/unlock of a user device, mobile payment, and building access control because of advantages, such as convenience and economic feasibility, but there is still security vulnerability in a field requiring a high level of security. For example, when a mobile electronic device communicates with a server that stores biometric information to authenticate a user or user information, there is a limitation in a method of authenticating biometric information through the mobile electronic device and because accuracy of a level required by the server is obtained, there may be a limitation in accuracy. In such a background, a study for providing a high level of security using biometric information has been actively performed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an authentication method, an apparatus, and a system based on biometric information.

Another aspect of the disclosure is to provide a method, an apparatus, and a system for authenticating a user or user information using some of biometric information.

In accordance with an aspect of the disclosure, a method of operating a terminal is provided. The method includes obtaining first partial fingerprint information, obtaining second partial fingerprint information, generating combination fingerprint information based on the first partial fingerprint information and the second partial fingerprint information, transmitting the combination fingerprint information to a server, and receiving an authentication result of the combination fingerprint information from the server.

In accordance with another aspect of the disclosure, a method of operating a server is provided. The method includes receiving an authentication request including user information and combination fingerprint information generated based on at least two partial fingerprint information, performing authentication based on reference fingerprint information corresponding to the user information and combination fingerprint information received from the terminal, and transmitting an authentication result to the terminal.

In accordance with another aspect of the disclosure, a terminal is provided. The terminal includes a transceiver, a sensor configured to obtain first partial fingerprint information and second partial fingerprint information, at least one processor configured to generate combination fingerprint information based on the first partial fingerprint information and the second partial fingerprint information and to control the transceiver to transmit the combination fingerprint information to the server and to control the transceiver to receive an authentication result of the combination fingerprint information from the server.

In accordance with another aspect of the disclosure, a server is provided. The server includes a transceiver, and at least one processor configured to control the transceiver to receive an authentication request including user information and combination fingerprint information generated based on at least two partial fingerprint information and to perform authentication based on reference fingerprint information corresponding to the user information and combination fingerprint information received from the terminal, and to control the transceiver to transmit an authentication result to the terminal.

Other aspects, advantages, and salient features of the disclosure will become apparent to those skilled in the art from the following description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description in conjunction with the accompanying drawings, in which.

Throughout the drawings, like reference numerals will be understood to refer to like parts, components, and structures.

DETAILED DESCRIPTION

Figure 1:
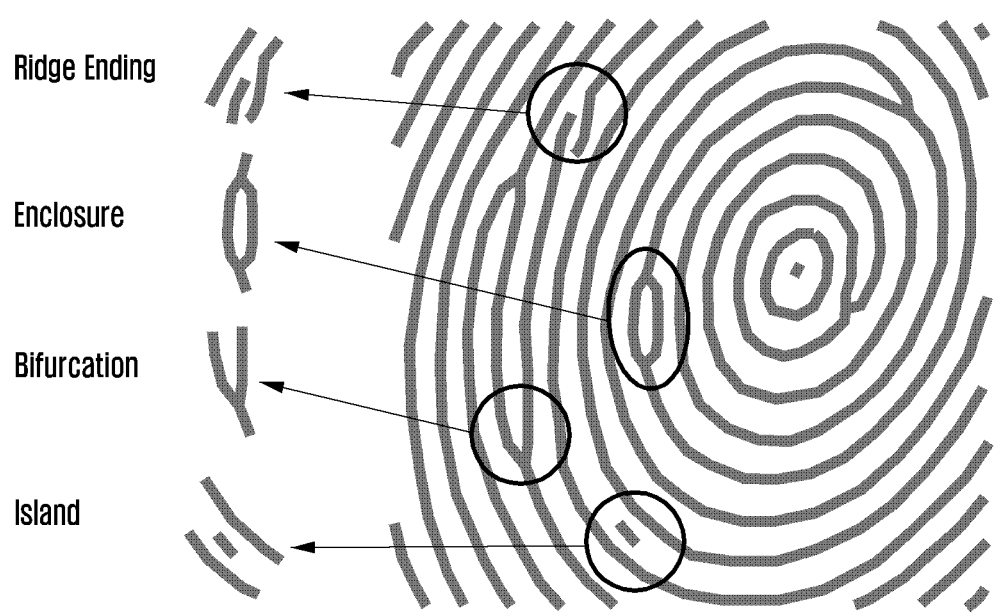
FIG. 1 is a diagram illustrating minutiae of a fingerprint according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

When describing an embodiment in this specification, a description of technical contents well known in the art of the disclosure and not directly related to the disclosure will be omitted. This is to clearly describe the subject matter of the disclosure, without obscuring the subject matter, by omitting any unnecessary description.

Similarly, in the attached drawings, some constituent elements are shown in an exaggerated or schematic form or are omitted. Further, a size of each constituent element does not entirely reflect an actual size. Like reference numerals designate like elements in the drawings.

The advantages and features of the disclosure and the manner of achieving them will become apparent with reference to the embodiments described below with reference to the accompanying drawings. The disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is only defined by the scope of the claims.

It will be understood that each block of the flowchart illustrations, and combinations of blocks in the flowchart illustrations, may be implemented by computer program instructions. These computer program instructions may be provided to a processor of a general-purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Biometric information according to an embodiment of the disclosure may include fingerprint information, iris information, contour information, vein information, voice information, and retinal information. In an embodiment of the disclosure, as typical biometric information, fingerprint information is exemplified. However, in the embodiment of the disclosure, biometric information is not limited to a fingerprint and an embodiment may be performed that performs authentication by processing partial information of other biometric information other than a fingerprint.

Biometric authentication is a method of authenticating an individual, user, and user information using individual intrinsic biometric information (or biometric recognition information). In the embodiment of the disclosure, biometric recognition information may be referred to as biometric information.

In an embodiment of the disclosure, fingerprint information may be information about an image or a pattern of a fingerprint and may be information about a position and/or shape of minutiae extracted from the fingerprint image or the fingerprint pattern.

In an embodiment of the disclosure, transmission or reception of a request or a response may be analyzed to transmission or reception of a request/response message and request/response information.

In an embodiment of the disclosure, a terminal may be defined to an electronic device including a fingerprint sensor or a fingerprint scanner for obtaining fingerprint information. The terminal may be the following device. The terminal may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a moving node, a mobile device, or other terms. Various embodiments of the terminal may include a cellular phone, smart phone having a wireless communication function, personal digital assistant (PDA) having a wireless communication function, wireless modem, portable computer having a wireless communication function, photographing device, such as a digital camera having a wireless communication function, gaming device having a wireless communication function, music storage and reproduction home appliances having a wireless communication function, Internet home appliances in which wireless Internet access and browsing are available, and mobile unit or terminals that integrate combinations of such functions.

Hereinafter, as an electronic device, a terminal is exemplified, but an electronic device according to the disclosure is not limited thereto and can be applied to all of the foregoing electronic devices and all devices that can communicate with a server and that can obtain biometric information.

FIG. 1 is a diagram illustrating minutiae of a fingerprint according to an embodiment of the disclosure.

Referring to FIG. 1, the minutiae means characteristic points, such as a ridge end, bifurcation, enclosure, and island that may be distinguished in fingerprint information or a fingerprint image. In the following description, characteristic points may mean minutiae distinguished from a fingerprint. Minutiae extracted from a fingerprint of the same person are constant. Therefore, by comparing or determining minutiae extracted from a fingerprint, a person, a user, and user information may be distinguished. Comparison of minutiae may be comparison of a position and the number of minutiae of first fingerprint information and second fingerprint information. First fingerprint information may be a user's reference fingerprint information stored at a biometric authentication server or a database. The first fingerprint information is a user's fingerprint information obtained through a fingerprint scanner or a fingerprint sensor and may be information about a fingerprint of a predetermined area or more or information about a fingerprint of a predetermined image size or more. The second fingerprint information is fingerprint information obtained through a terminal, mobile terminal, fingerprint scanner, and fingerprint sensor and may be information about a fingerprint of a predetermined area or more and may be fingerprint information of a size smaller than a predetermined area. Fingerprint information of a size smaller than a predetermined area may be defined to partial fingerprint information. The area is an area in which a fingerprint is obtained and may be defined to a size in which a fingerprint is obtained. The first fingerprint information may be fingerprint information including minutiae of the predetermined number or more. An obtaining area of a fingerprint is generally proportional to the number of minutiae. For example, when sizes of the fingerprint sensor are 20.32 mm*15.24 mm, 15.50 mm*12.80 mm, and 4.00 mm*10.00 mm, an area may be changed in which a fingerprint is obtained at one time according to a size of the fingerprint sensor, and because sizes of an area that obtains the fingerprint are different, the number of obtained minutiae may be changed.

Figure 2:
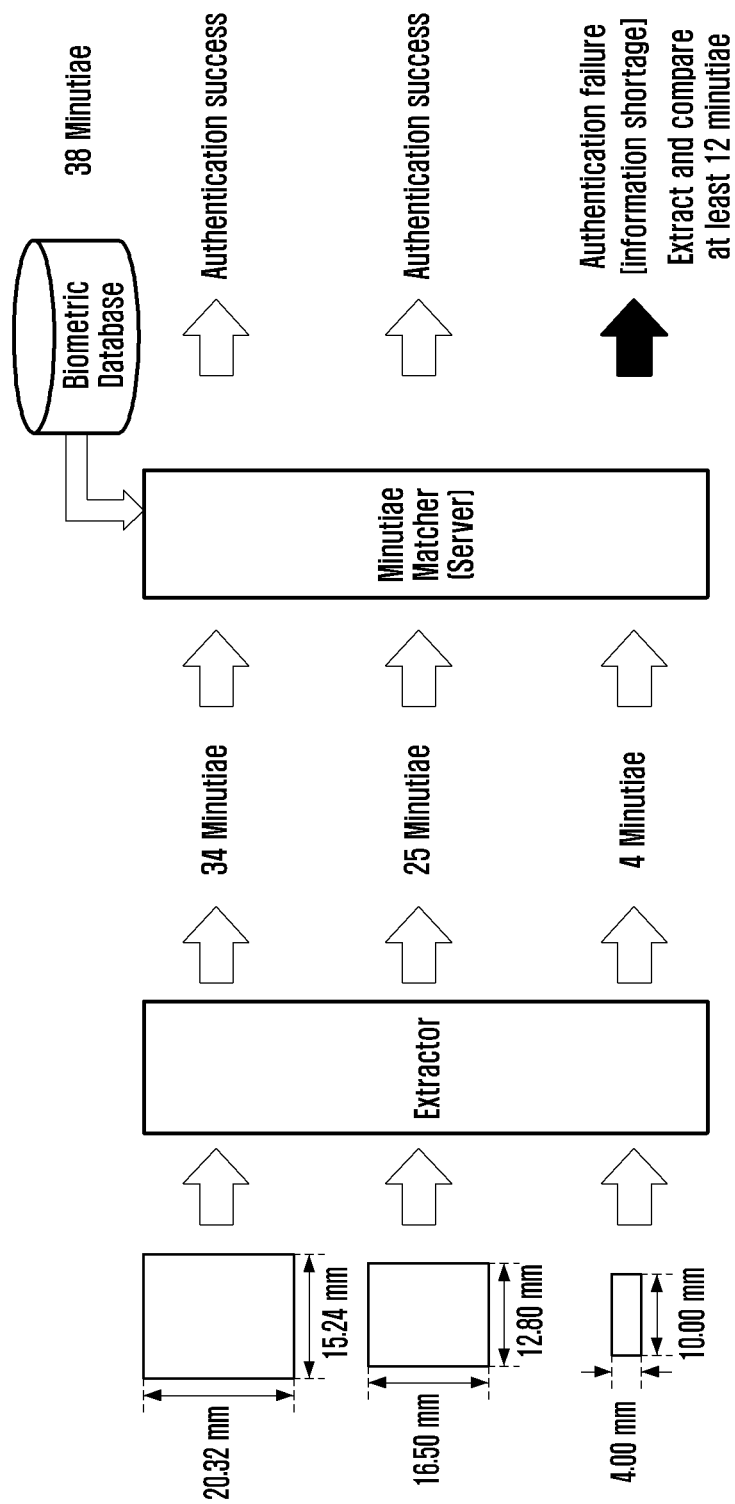
FIG. 2 is a diagram illustrating authentication according to an amount of fingerprint information according to an embodiment of the disclosure.

FIG. 2 is a diagram illustrating authentication according to an amount of fingerprint information according to an embodiment of the disclosure.

Referring to FIG. 2, fingerprint information of different areas is obtained from a fingerprint sensor or a fingerprint scanner of different sizes, minutiae of the different numbers is extracted from fingerprint information of different areas, and authentication success and authentication failure are determined according to the number of minutiae.

In FIG. 2, it is assumed that sizes of the fingerprint sensor of the terminal are 20.32 mm*15.24 mm, 15.50 mm*12.80 mm, and 4.00 mm*10.00 mm. At a biometric database, reference fingerprint information about at least one user may be stored. For example, it is assumed that reference fingerprint information of a user A stored at the biometric database includes 38 minutiae.

When a fingerprint is obtained through a fingerprint sensor, an extractor may extract minutiae. When sizes of the fingerprint sensor are different, areas of an extracted fingerprint may be different, and the number of minutiae extracted from different areas may be different.

When a size of the fingerprint sensor is 20.32 mm*15.24 mm, 34 minutiae may be extracted through the extractor. When a size of the fingerprint sensor is 15.50 mm*12.80 mm, 25 minutiae may be extracted through the extractor. When a size of the fingerprint sensor is 4.00 mm*10.00 mm, 4 minutiae may be extracted.

A minutiae matcher may compare minutiae determined through the extractor with reference fingerprint information stored at a biometric database to determine whether the predetermined number or more of minutiae are matched (or correspond), thereby authenticating a user. The minutiae matcher may be a server that communicates with the terminal and the biometric database. Further, the minutiae matcher may exist within the terminal. Matching of minutiae means that a position and shape of the minutiae are identical or correspond in a fingerprint. For example, when 12 minutiae of fingerprint information obtained through a fingerprint sensor of the terminal are matched to minutiae of reference fingerprint information, it may be set that authentication is successful. The number of minutiae is not limited thereto, and when security is strengthened, many minutiae may be set to the reference number, and when security is weakened, smaller minutiae may be set to the reference number.

When sizes of the fingerprint sensor are 20.32 mm*15.24 mm and 15.50 mm*12.80 mm, the number of minutiae of fingerprint information obtained from the terminal is 12 or more. Thus, when comparing minutiae of fingerprint information obtained from the terminal with minutiae of the biometric database, minutiae of 12 or more is determined and authentication may be thus succeeded. However, when a size of the fingerprint sensor is 4.00 mm*10.00 mm, the number of minutiae extracted through the terminal is 4. Therefore, the minimum minutiae number to compare with reference fingerprint information stored at the biometric database is not secured. Thus, authentication cannot be performed. A size of a fingerprint sensor or a fingerprint scanner of the terminal or the electronic device may be limited. Because a size of the fingerprint sensor is small, only the limited number of minutiae is obtained from a fingerprint of a limited area. Thus, when a security reference is high, there is a problem that a security condition cannot be satisfied. Therefore, there is required a method of performing authentication of a high security level using a partial fingerprint obtained from a size of a limited fingerprint sensor that cannot obtain the predetermined minutiae number at one time.

Figure 3:
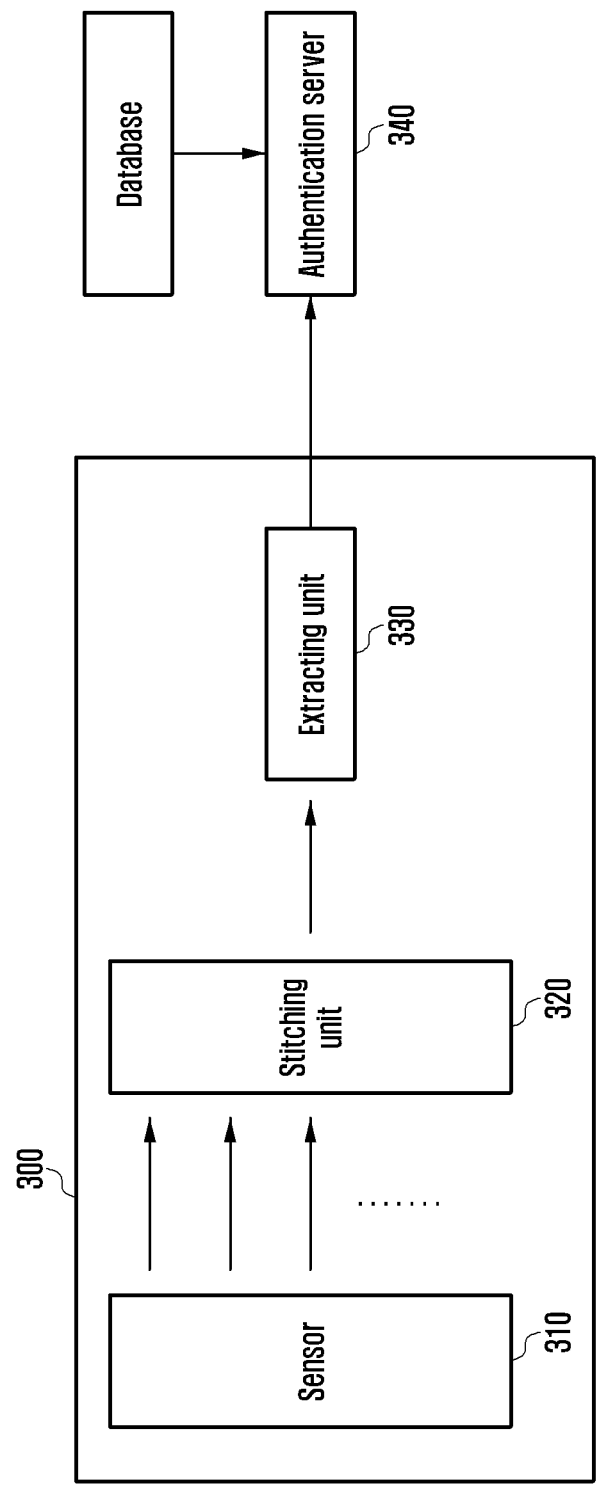
FIG. 3 is a block diagram illustrating a method of authenticating a fingerprint according to a first embodiment of the disclosure.

FIG. 3 is a block diagram illustrating a method of authenticating a fingerprint according to a first embodiment of the disclosure.

Referring to FIG. 3, a terminal 300 may include a sensor 310, a stitching unit 320 (or stitching processor), and an extracting unit 330 (or extracting processor). The sensor 310 obtains fingerprint information by contact or non-contact with a user finger in the terminal 300. The stitching unit 320 and the extracting unit 330 may be a controller of the terminal. The stitching unit 320 may combine partial fingerprint information with combination fingerprint information. The extracting unit 330 may extract minutiae from the combination fingerprint information. An authentication server 340 may compare fingerprint information extracted from the terminal 300 with reference fingerprint information stored at a database to perform authentication.

In the first embodiment of the disclosure, the terminal 300 may obtain a plurality of partial fingerprints using the sensor 310. When a partial fingerprint is obtained, the stitching unit 320 may stitch the partial fingerprint to generate a combination fingerprint. Stitching means an operation that obtains a combination fingerprint or a full fingerprint by connecting partial fingerprint information. The combination fingerprint may be a full fingerprint or fingerprint information combined to a predetermined size or more by connecting partial fingerprints. For example, because a size of the sensor 310 is limited and a size of minutiae extracted from the limited sensor is limited, by stitching a plurality of partial fingerprints, a combination fingerprint is generated.

When the stitching unit 320 exists in the terminal 300, in the terminal 300, a full fingerprint or a combination fingerprint may be generated from a partial fingerprint. The stitching unit 320 may exist in the server instead of the terminal 300. In this case, the server may include a stitching unit and an extractor, and when the terminal transmits information about a partial fingerprint to the server, the stitching unit of the server may generate a full fingerprint or a combination fingerprint.

The extracting unit 330 may change a full fingerprint or a combination fingerprint generated by the partial fingerprint to fingerprint data of a format for authentication. For example, the extracting unit 330 may distinguish minutiae from the combination fingerprint or the full fingerprint. The extracting unit 330 may distinguish a position and shape of minutiae. A form of minutiae is shown in FIG. 1.

Fingerprint data obtained from the extracting unit 330 may be transmitted to the authentication server 340. The authentication server 340 may compare fingerprint data information received from the terminal 300 with reference fingerprint information received from a database to authenticate a user. For example, the authentication server 340 compare minutiae of fingerprint data with the reference fingerprint information, and when minutiae having the same position and shape are the predetermined number or more, the authentication server 340 may determine that authentication is successful, and when minutiae having the same position and shape are less than the predetermined number, the authentication server 340 may determine that authentication is not successful. The authentication server 340 may transmit an authentication result to the terminal 300.

Figure 4:
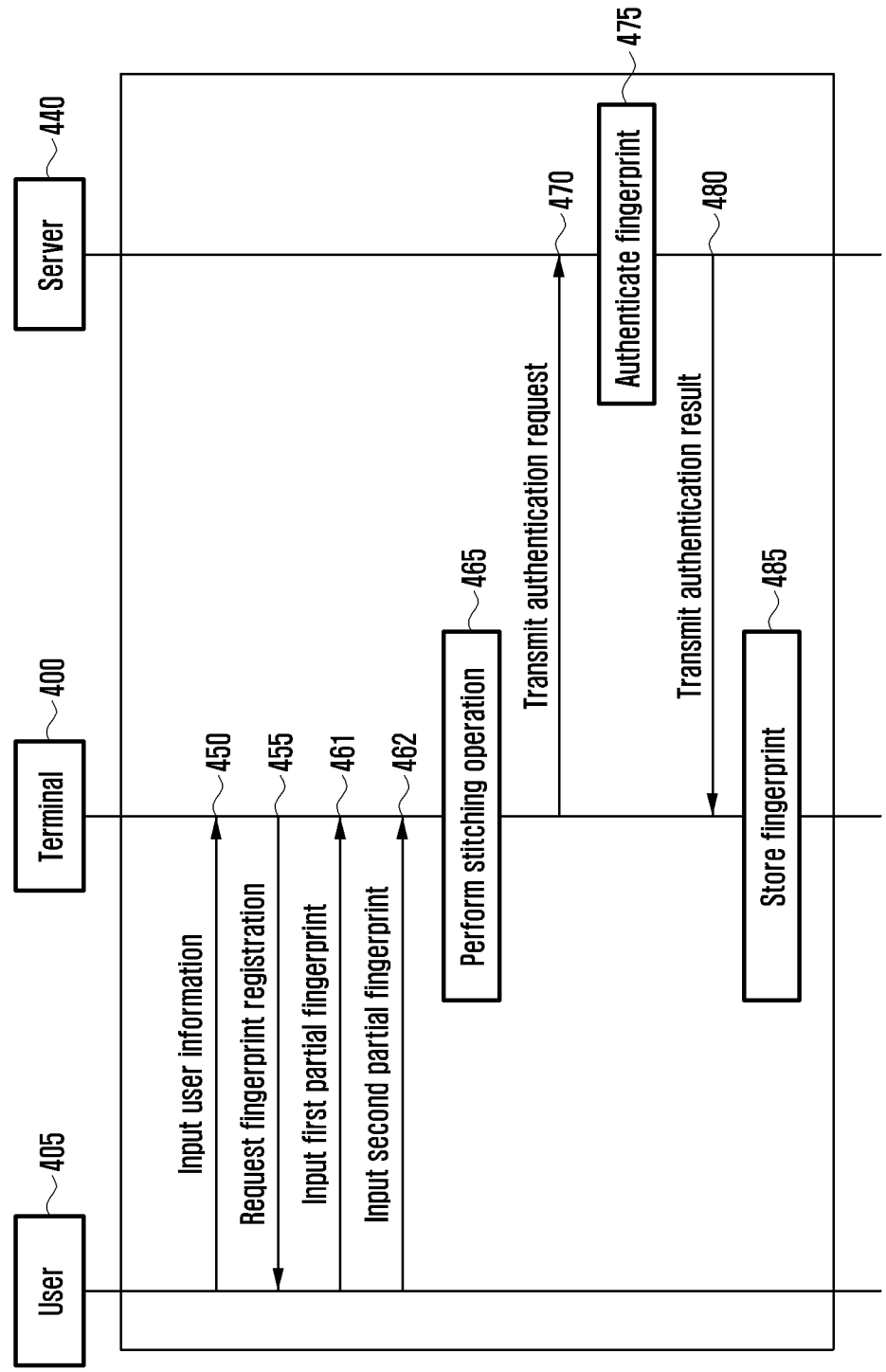
FIG. 4 is a message flow diagram illustrating a combination fingerprint configuration and a registration process according to a first embodiment of the disclosure.

FIG. 4 is a message flow diagram illustrating a combination fingerprint configuration and a registration process according to a first embodiment of the disclosure. The first embodiment illustrates a method of configuring a full fingerprint or a combination fingerprint in the terminal and performing fingerprint authentication at a server.

Referring to FIG. 4, a system for registering a fingerprint may include a user 405, a terminal 400, and a server 440.

The user 405 may input user information at operation 450. The user information may be information that uses for distinguishing the user in conjunction with the fingerprint information. For example, the user information may be information, such as an identification number (e.g., 12-digit identification numbers in an Adar system of India), social security number, identification (ID), and phone number given to each user. The user 405 may input user information to the terminal 400 at operation 450.

The terminal 400 may request fingerprint registration at operation 455. For example, the terminal 400 may display information that requests fingerprint registration in a display of the terminal 400.

The user 405 may input a fingerprint to a fingerprint sensor of the terminal 400 at operation 461. Because a size of the fingerprint sensor of the terminal 400 is limited, fingerprint information input through the fingerprint sensor may be partial fingerprint information. The terminal 400 may obtain first partial fingerprint information. The user 405 may additionally input a fingerprint to the fingerprint sensor of the terminal 400 at operation 462. In this case, by moving a location of the finger corresponding to the sensor, the user 405 may input fingerprint information different from the fingerprint information input at previous steps. The terminal 400 may obtain second partial fingerprint information. The user 405 may perform a partial fingerprint input operation, such as operation 462 by n times while changing a position of a finger corresponding to the sensor, and the terminal 400 may obtain the n number of partial fingerprint information.

The terminal 400 may determine that partial fingerprint information is secured by a predetermined reference or more and request completion of a partial fingerprint input operation, completion of a partial fingerprint information obtaining operation, or stop of a partial fingerprint input operation.

The terminal 400 may perform a stitching operation at operation 465. The terminal 400 may connect the n number of partial fingerprint information to generate the user's full fingerprint or combination fingerprint. The stitching operation may be performed after the n number of partial fingerprint information is obtained or may be performed whenever new fingerprint information is additionally obtained after at least two partial fingerprint information is obtained.

The terminal 400 transmits an authentication request to the server 440 at operation 470. The authentication request may include user information and information about the user's combination fingerprint. In this case, after the combination fingerprint is received from the server 440, minutiae of the combination fingerprint may be extracted, and the terminal 400 may extract minutiae from the stitched combination fingerprint to include information about the minutiae and user information in the authentication request and to transmit the information to the server 440. The information about minutiae may be information about a location and shape of minutiae.

The server 440 performs fingerprint authentication at operation 475. The server 440 may compare an authentication request received from terminal 400 with reference fingerprint information received from a biometric database to perform fingerprint authentication. The server 440 may receive reference fingerprint information identical to or corresponding to user information from the database and compare fingerprint information received from the terminal 400 with the reference fingerprint information.

A fingerprint authentication procedure may be performed in each of the server 440 and the biometric database. For example, the server 440 may store some of information about the reference fingerprint and store the remaining portions of information about the reference fingerprint at the biometric database to authenticate information about a combination fingerprint requested by the terminal 400 at each of the server 440 and the database.

The server 440 may transmit an authentication result to the terminal 400 at operation 480. When fingerprint authentication is successful, the server 440 may transmit notification indicating fingerprint authentication success, and when fingerprint authentication is not successful, the server 440 may transmit notification indicating fingerprint authentication failure.

When fingerprint authentication is successful, the terminal 400 stores fingerprint information at operation 485. The fingerprint information may be stored at a trust zone or embedded secure element of the terminal 400 and may be encrypted and stored. For example, the fingerprint information may be encrypted and stored in a secure area of a universal integrated circuit card (UICC) or an embedded universal integrated circuit card (eUICC). In this case, the stored fingerprint information is information about a combination fingerprint. For example, the terminal 400 may obtain a plurality of partial fingerprints, receive authentication of a generated combination fingerprint from the server, and store the combination fingerprint authenticated by the server therein.

Through the above process, the terminal 400 may perform authentication of a plurality of partial fingerprints obtained therethrough with the server using the reference fingerprint information.

Figure 5:
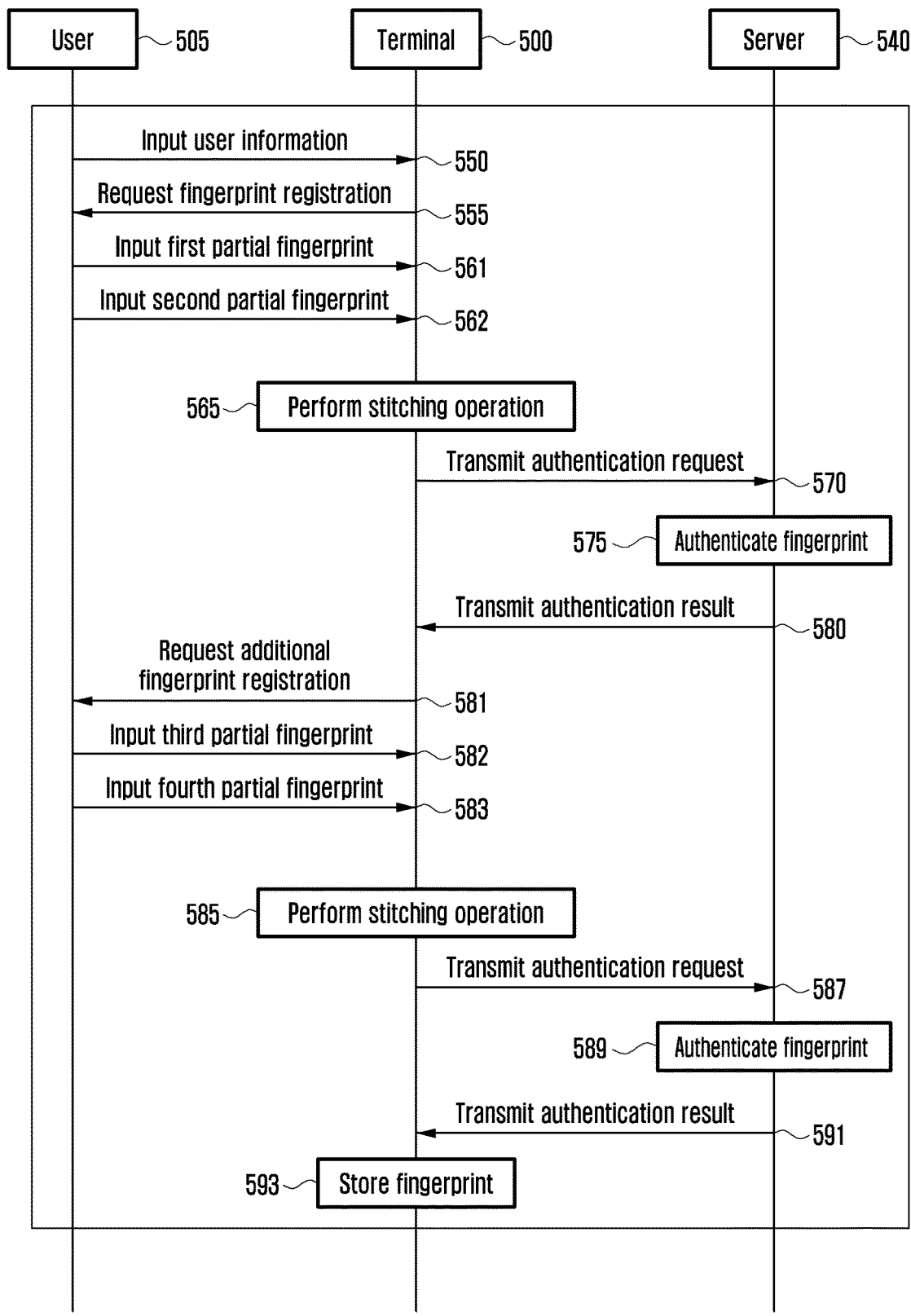
FIG. 5 is a message flow diagram illustrating an improved partial fingerprint input method in a combination fingerprint configuration and a registration process according to a first embodiment of the disclosure.

FIG. 5 is a message flow diagram illustrating an improved partial fingerprint input method in a combination fingerprint configuration and a registration process according to a first embodiment of the disclosure. A detailed description of an operation corresponding to FIG. 4 in a configuration of FIG. 5 will be described with reference to FIG. 4.

Referring to FIG. 5, a system for registering a fingerprint may include a user 505, a terminal 500, and a server 540.

The user 505 may input user information at operation 550. The terminal 500 may request fingerprint registration at operation 555. For example, in a display of the terminal 500, information requiring fingerprint registration may be displayed.

The user 505 may input a fingerprint to a fingerprint sensor of the terminal 500 at operation 561. The terminal 500 may obtain first partial fingerprint information. The user 505 may additionally input a fingerprint to the fingerprint sensor of the terminal 500 at operation 562. The terminal 500 may obtain second partial fingerprint information. The terminal 500 may obtain the k number of partial fingerprint information satisfying a predetermined condition. The k number of partial fingerprint information may be determined based on the number or an image size of minutiae.

In the embodiment described with reference to FIG. 4, when obtaining full fingerprint information by obtaining a plurality of partial fingerprint information, much time may be consumed. Because authentication of the terminal 500 and the server 540 compares the identity of minutiae of the predetermined number or more instead of comparing entire minutiae of the fingerprint, when obtaining a combination fingerprint in order to compare minutiae of the predetermined number or more, in a partial fingerprint input/obtaining process, a time may be reduced and a stitching process may be also simplified.

Table 1 represents a relationship between the number of minutiae and the partial fingerprint input number on a service basis.

TABLE 1

| Service classification | Minutiae condition | The partial fingerprint input number for obtaining minutiae |
|---|---|---|
| Service 1 | 12 pieces | 13 pieces/4 times |
| Service 2 | 10 pieces | 10 pieces/2 times |
| Service 3 | 20 pieces | 20 pieces/4 times |
| Service 4 | 3 pieces | 4 pieces/1 time |
| . . . | | |

Services 1, 2, 3, and 4 may be provided through fingerprint authentication. For example, the service 1 may be a financial service, the service 2 may be a Web hard service, the service 3 may be a secret information storage server, and the service 4 may be a login service. A minutiae condition means the number of minimum minutiae required for authentication in a corresponding service. When the number of minutiae conditions are 12, if at least 12 minutiae are the same between reference fingerprint information and a combination fingerprint obtained by stitching partial fingerprint information in the terminal, it is determined that authentication is successful. In minutiae obtained through a plurality of partial fingerprints, the number of different minutiae should satisfy a predetermined minutiae condition. As minutiae conditions increase, security may be strengthened. However, when minutiae conditions increase, the number that should obtain partial fingerprint information may increase. The number of partial fingerprint inputs for obtaining minutiae is an illustration. For example, it is assumed that the number of minutiae obtained at one time by the sensor of the terminal is approximately 4 or 5. 13 pieces/4 times for the service 1 mean that 13 minutiae are obtained through partial fingerprint inputs of four times, and 10 pieces/2 times for the service 2 mean that 10 minutiae are obtained through partial fingerprint inputs of two times.

The extracting unit of the terminal 500 may extract minutiae. A stitching result is transferred to the extracting unit, and the extracting unit may extract minutiae and determine whether the number of minutiae satisfies a condition of Table 1.

Table 2 represents an image size and the partial fingerprint input number.

TABLE 2

| Service classification | Image size condition | The partial fingerprint input number |
|---|---|---|
| Service 1 | 20.32 mm * 15.24 mm | 12 times |
| Service 2 | 15.50 mm * 12.80 mm | 10 times |
| ... | | |

Service classification is shown in Table 1. An image size condition means a size of combination fingerprint information obtained through partial fingerprint information. As an image size requiring in the image size condition increases, security may be strengthened. However, as an image size increases, the number of partial prints that should input to satisfy an image size condition by combining partial fingerprints may increase. An image size condition of Table 2 may be verified in the stitching unit of the terminal 500. The stitching unit may combine partial fingerprint information, verify an image size of the combination fingerprint information, and determine whether the combination fingerprint satisfies a condition of Table 2. Further, the image size condition may be verified in the extracting unit of the terminal 500. The extracting unit may verify an image size as well as the number of minutiae. In an embodiment of the disclosure, the stitching unit and the extracting unit may be configured with different processors and may be operated by the same processor, but may be logically treated as different blocks.

A condition according to Table 1 or 2 may be previously stored in the terminal 500 or may be received from the server 540. A time in which the terminal 500 receives a condition according to Table 1 or 2 from the server 540 is not particularly limited and the condition should be obtained before operation 570.

The terminal 500 performs a stitching operation using the received partial fingerprint information at operation 565. The terminal 500 determines whether a stitching result of the partial fingerprint satisfies a condition set according to Table 1 or 2. If a stitching result of the partial fingerprint satisfies a condition, the terminal transmits an authentication request to the server 540 at operation 570. For example, the condition of Tables 1 and 2 may be a trigger condition for transmitting an authentication request after the terminal 500 obtains a partial fingerprint. The authentication request may include user information and information about a combination fingerprint of the user.

The server 540 performs fingerprint authentication at operation 575. The server 540 may compare an authentication request received from the terminal 500 with reference fingerprint information obtained from a biometric database to perform fingerprint authentication. The reference fingerprint information may be previously stored at the server 540.

The server 540 transmits an authentication result to the terminal 500 at operation 580. When fingerprint authentication is successful, the server 540 may transmit notification indicating fingerprint authentication success, and when fingerprint authentication is not successful, the server 540 may transmit notification indicating fingerprint authentication failure. When a minimum condition of Table 1 or 2 is satisfied, the terminal 500 transmits an authentication request, but when partial information of a minimum condition is not appropriate, authentication may be failed. When authentication is successful, the terminal 500 stores a combination fingerprint obtained through a partial fingerprint.

When fingerprint authentication is not successful, the terminal 500 requests additional fingerprint registration at operation 581.

The user 505 may input a third partial fingerprint at operation 582, and the terminal 500 may obtain third partial fingerprint information. The user 505 may input a fourth partial fingerprint at operation 583, and the terminal 500 may obtain fourth partial fingerprint information. When additional partial fingerprint information is obtained with such an operation, the terminal 500 performs a stitching operation at operation 585.

The terminal 500 transmits an authentication request to the server 540 at operation 587. The server 540 may perform fingerprint authentication at operation 589. The server 540 may transmit an authentication result to the terminal 500 at operation 591.

When fingerprint authentication is successful, the terminal 500 may store fingerprint information at operation 591. The terminal 500 may encrypt and store combination fingerprint information at operation 593. When fingerprint authentication is not successful, the terminal 500 may request again an additional input of fingerprint registration.

In the embodiment described with reference to FIG. 5, the number of partial fingerprint inputs can be efficiently managed with such a method.

Figure 6:
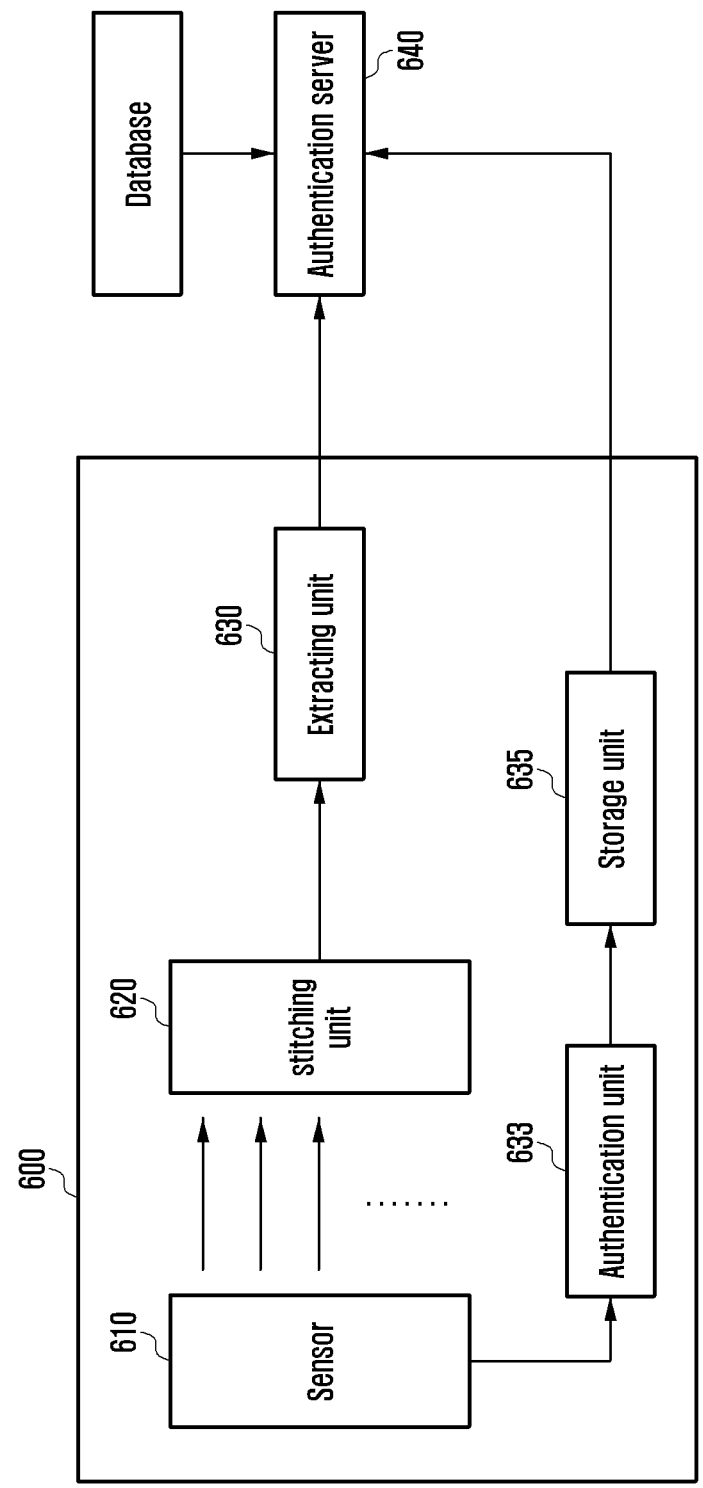
FIG. 6 is a block diagram illustrating a method of authenticating a fingerprint according to a second embodiment of the disclosure.

FIG. 6 is a block diagram illustrating a method of authenticating a fingerprint according to a second embodiment of the disclosure.

Referring to FIG. 6, a terminal 600 may include a sensor 610, a stitching unit 620, an extracting unit 630, an authentication unit 633, and a storage unit 635. The sensor 610 obtains fingerprint information by contact or non-contact with a user finger in the terminal 600. The stitching unit 620 may generate combination fingerprint information by combining partial fingerprint information. The extracting unit 630 may extract minutiae from combination fingerprint information. The stitching unit 620, the extracting unit 630, and the authentication unit 633 may be a controller of the terminal 600. An authentication server 640 may be a server that performs authentication by comparing fingerprint information extracted from the terminal 600 with reference fingerprint information stored at a database.

The terminal 600 may obtain a plurality of partial fingerprints using the sensor 610. When a partial fingerprint is obtained, the terminal 600 may stitch the partial fingerprint in the stitching unit 620 to generate a combination fingerprint.

When the stitching unit 620 exists in the terminal 600, in the terminal 600, a full fingerprint or a combination fingerprint may be generated from the partial fingerprint. The extracting unit 630 may change the combination fingerprint or the full fingerprint generated from the partial fingerprint to fingerprint data of a format for authentication. For example, the extracting unit 630 may distinguish minutiae from the combination fingerprint or the full fingerprint. The extracting unit 630 may distinguish a location and shape of minutiae.

Fingerprint data obtained from the extracting unit 630 may be transmitted to the authentication server 640. The authentication server 640 may compare fingerprint data information received from the terminal 600 with reference fingerprint information received from the database to authenticate a user. For example, by comparing minutiae of fingerprint data with the reference fingerprint information, when minutiae having the same position and shape is the predetermined number or more, the authentication server 640 may determine that authentication is successful, and when minutiae having the same position and shape is less than the predetermined number, the authentication server 640 may determine that authentication is not successful. The authentication server 640 may transmit an authentication result to the terminal 600.

When authentication is successful, the terminal 600 may store the authenticated combination fingerprint at the storage unit 635. The storage unit 635 may be a secure area of the terminal 600. The terminal 600 may encrypt the combination fingerprint succeeded in authentication to store the combination fingerprint in the secure area.

In the first embodiment of the disclosure, the user inputs a plurality of partial fingerprints each time to transmit a combination fingerprint to the authentication server and authenticates a fingerprint based on the combination fingerprint. The second embodiment provides a method of simplifying an authentication process after performing first authentication by extending the first embodiment.

When performing an authentication procedure after first authentication, the user inputs partial fingerprint information to the sensor 610 of the terminal 600. When authentication is successful by the authentication server 640 with the partial fingerprint information, the authentication unit 633 compares the partial fingerprint information with the combination fingerprint stored at the storage unit 635. When the partial fingerprint information corresponds to the combination fingerprint information, the terminal 600 transmits the combination fingerprint information stored at the storage unit to the authentication server 640 to request authentication. The authentication server 640 compares the combination fingerprint with reference fingerprint information obtained from the database to perform authentication and provides an authentication result to the terminal 600.

In the second embodiment of the disclosure, when performing additional authentication after first authentication, the authentication server 640 compares partial fingerprint information input for additional authentication with the combination fingerprint information stored in the terminal 600 after authentication success, and when local authentication is successful, the terminal 600 transmits combination fingerprint information stored therein to the authentication server 640 to perform authentication. Thus, in an additional authentication process, a process of inputting/obtaining a plurality of partial fingerprints can be simplified.

Figure 7:
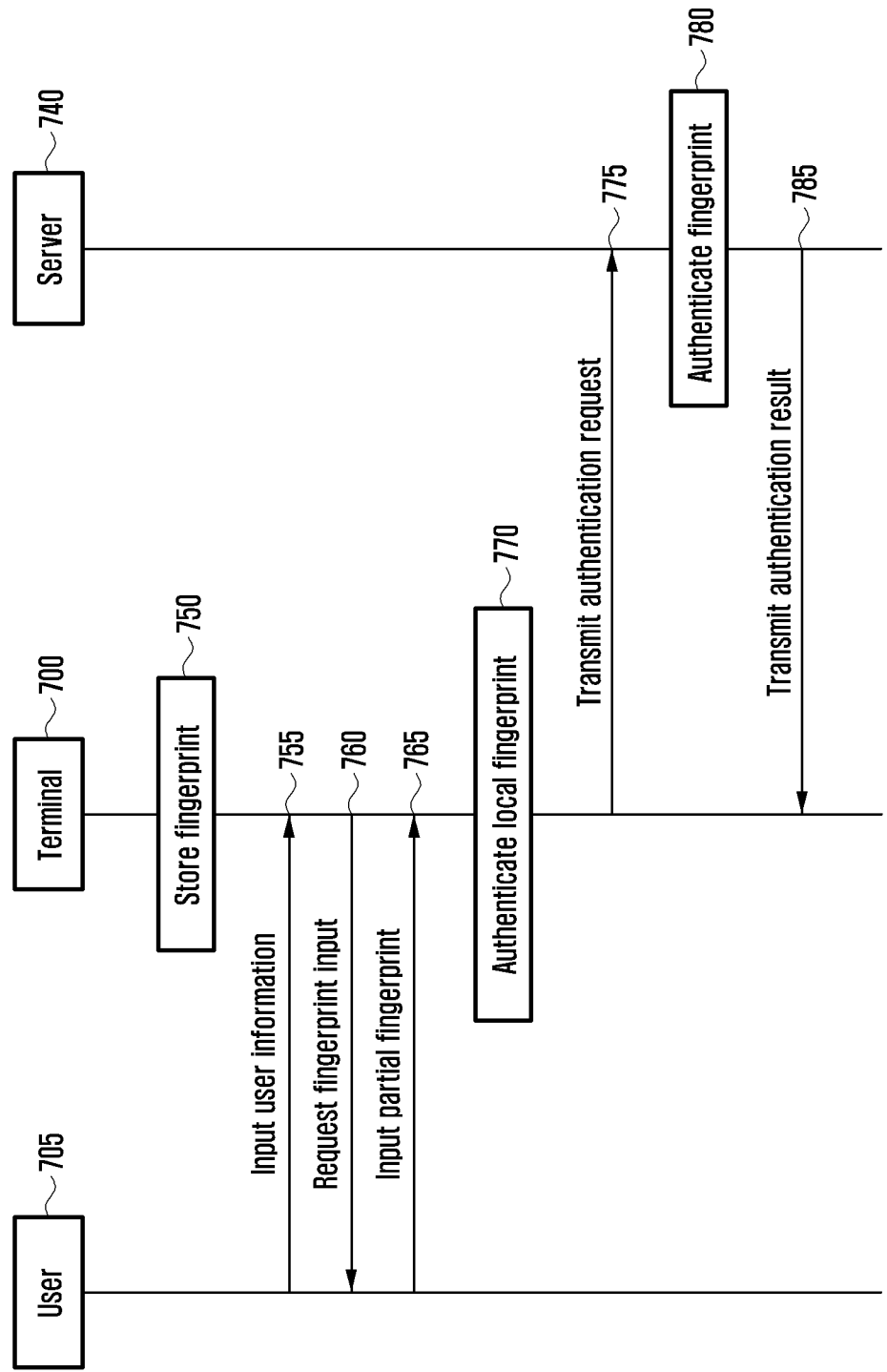
FIG. 7 is a message flow diagram illustrating an authentication process according to a second embodiment of the disclosure.

FIG. 7 is a message flow diagram illustrating an authentication process according to a second embodiment of the disclosure.

Referring to FIG. 7, because the second embodiment of the disclosure is an extended embodiment of the first embodiment of the disclosure, an operation of the first embodiment may be equally applied to the second embodiment. A final operation of FIGS. 4 and 5 is an operation in which a terminal stores fingerprint information succeeded in authentication when authentication with the server is successful. FIG. 7 illustrates a process of additionally authenticating after a terminal succeeded in authentication with the server stores a combination fingerprint succeeded in authentication according to a method of FIG. 4 or 5.

It is assumed that fingerprint information succeeded in authentication by a server 740 is stored at a terminal 700 at operation 750. The fingerprint information may be combination fingerprint information generated as a stitching result of partial fingerprint information and may be encrypted and stored in a secure area of the terminal 700.

After a first authentication input of a user 705, when authentication information is additionally required, the user 750 may input user information to the terminal 700 at operation 755.

The terminal 700 may request a fingerprint input at operation 760. For example, the terminal 700 may display to input a fingerprint corresponding to user information in a display thereof.

The user 705 may input a fingerprint to the fingerprint sensor of the terminal 700 at operation 765. Because a size of the sensor is limited, the fingerprint may be partial fingerprint information. A process of obtaining partial fingerprint information may be 1 times or n times. A process of obtaining partial fingerprint information may be determined according to the number of minutiae or a size of a fingerprint image required by the terminal for local fingerprint authentication. When the number of minutiae or an image size required in local authentication can be obtained by a partial fingerprint input of one time, the partial fingerprint input number may be 1, and when the number of minutiae or an image size required by local authentication can be obtained by a plurality of partial fingerprint inputs, the plurality of partial fingerprint inputs, a stitching process, and a minutiae extraction process may be performed.

The terminal 700 performs local fingerprint authentication at operation 770. Local fingerprint authentication means a process of comparing the partial fingerprint input through operation 765 with the fingerprint information stored in the terminal at operation 750 to internally perform authentication in the terminal 700. When fingerprint information obtained from the partial fingerprint corresponds to the fingerprint information stored in the terminal 700, the terminal 700 may determine that local fingerprint authentication is successful, and when fingerprint information obtained from the partial fingerprint does not correspond to the fingerprint information stored in the terminal 700, the terminal 700 may determine that local fingerprint authentication is not successful. When collection of fingerprint information required for local fingerprint authentication is insufficient, the process continues at operation 760 and the terminal 700 may request an additional fingerprint input.

When local fingerprint authentication is successful, the terminal 700 transmits an authentication request to the server 740 at operation 775. The authentication request may include fingerprint information stored in the terminal 700 at operation 750 and further include user information. In the second embodiment of the disclosure, information input by the user for authentication is partial fingerprint information, but when local fingerprint authentication is successful, fingerprint information provided to the server by the terminal 700 is fingerprint information stored in the terminal 700 at operation 750 instead of partial fingerprint information input at operation 765.

The server 740 may compare fingerprint information received from the terminal 700 with reference fingerprint information obtained from the database to perform authentication at operation 780.

The server 740 may transmit an authentication result to the terminal 700 at operation 785. When fingerprint authentication is successful, the server 740 may transmit notification indicating fingerprint authentication success, and when fingerprint authentication is not successful, the server 740 may transmit notification indicating fingerprint authentication failure.

When additional authentication is performed after first authentication, the terminal 700 may perform authentication with the server 740 using the partial fingerprint.

Figure 8:
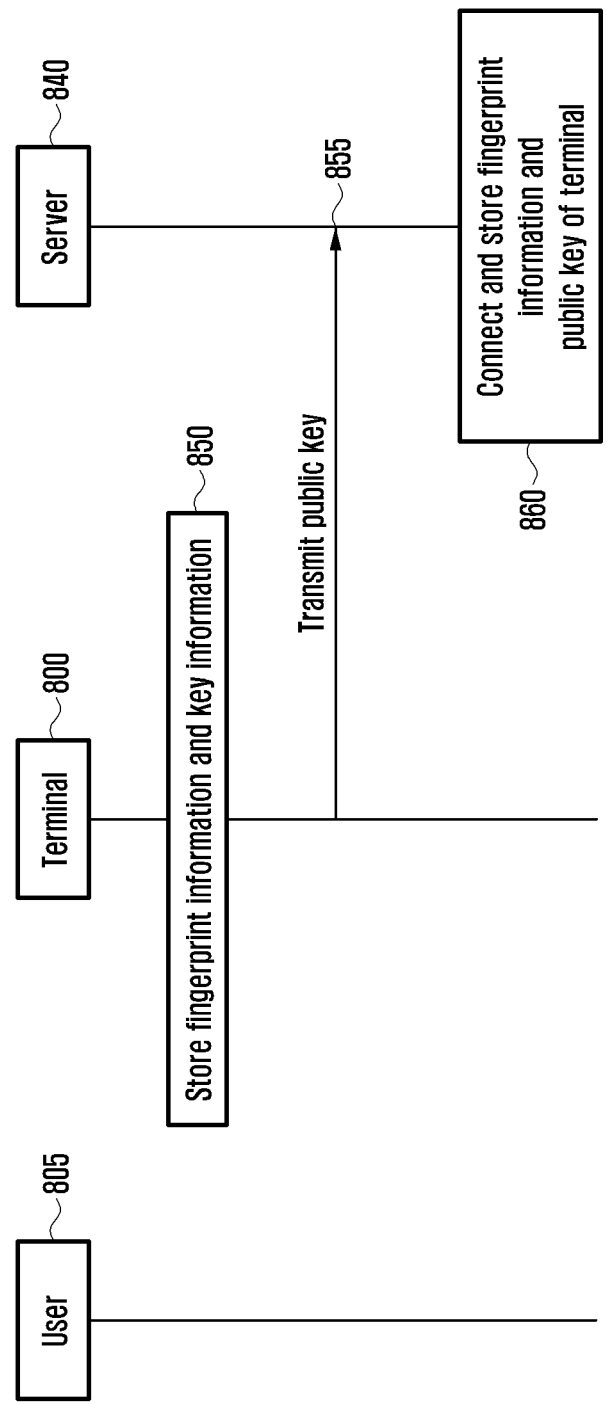
FIG. 8 is a message flow diagram illustrating a method of using a key and fingerprint registration in a third embodiment of the disclosure.

FIG. 8 is a message flow diagram illustrating a method of using a key and fingerprint registration in a third embodiment of the disclosure.

Because the third embodiment of the disclosure is an extended embodiment of the first embodiment of the disclosure, an operation of the first embodiment can be equally applied to the third embodiment. A final operation of FIGS. 4 and 5 is an operation in which the terminal stores fingerprint information succeeded in authentication when authentication with the server is successful. FIG. 8 illustrates a process in which the terminal succeeded in authentication with the server stores a combination fingerprint succeeded in authentication according to a method of FIG. 4 or 5 and manages the combination fingerprint together with a key.

Referring FIG. 8, a user 805 is included and when a fingerprint obtained by a terminal 800 receives authentication of a server 840 through the process of FIG. 4 or 5, the terminal 800 may generate a key for generating a fingerprint. The terminal 800 may generate a public key and a private key. The terminal 800 may store fingerprint information authenticated by the server 840 and the public key and the private key at operation 850. The public key and the private key may be stored at a secure area of the terminal 800.

The terminal 800 may transmit the public key to the server 840 at operation 855.

The server 840 may connect and store authenticated fingerprint information of the terminal and the public key at operation 860.

When an authentication request is received from the terminal 800, the server 840 may verify a signature using the public key and perform additional authentication through signature verification.

Figure 9:
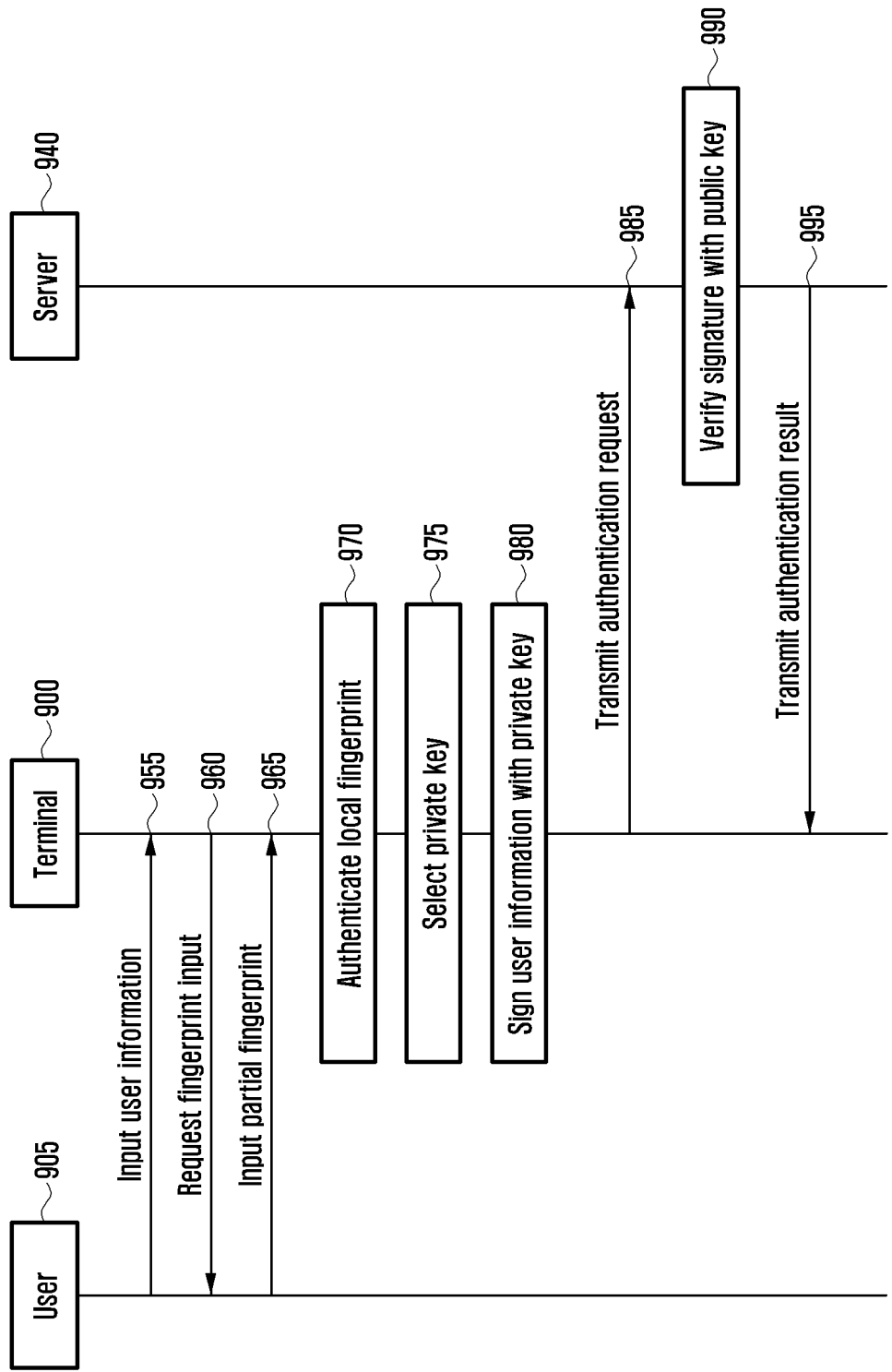
FIG. 9 is a message flow diagram illustrating a process of performing authentication based on partial fingerprint information and key information in a fourth embodiment of the disclosure.

FIG. 9 is a message flow diagram illustrating a process of performing authentication based on partial fingerprint information and key information in a fourth embodiment of the disclosure.

Referring FIG. 9, the fourth embodiment corresponds to a combination of the second embodiment and the third embodiment. In the fourth embodiment of the disclosure, before operation 955, it is assumed that a public key and a private key corresponding to fingerprint information are stored at a terminal 900 with a method of the third embodiment of the disclosure, and it is assumed that the server 940 connects and stores the public key and the private key of the terminal 900.

Referring to FIG. 9, when authentication is additionally required after first authentication, a user 905 may input user information to the terminal 900 at operation 955.

The terminal 900 may request a fingerprint input to the user 905 at operation 960. For example, the terminal 900 may display to input a fingerprint corresponding to user information in a display thereof.

The user 905 may input a fingerprint to a fingerprint sensor of the terminal 900 at operation 965. Because a size of the sensor is limited, the fingerprint may be partial fingerprint information. A process of obtaining partial fingerprint information may be 1 times or n times. A process of obtaining partial fingerprint information may be determined according to the number of minutiae or a size of a fingerprint image required by the terminal for local fingerprint authentication. When the number of minutiae or an image size required in local authentication can be obtained by a partial fingerprint input of one time, the partial fingerprint number may be 1 times, and when the number of minutiae or an image size required in local authentication can be obtained by a plurality of partial fingerprint inputs, a plurality of partial fingerprint inputs, a stitching process, and a minutiae extraction process may be performed.

The terminal 900 performs local fingerprint authentication at operation 970. Local fingerprint authentication means a process of comparing a partial fingerprint input through operation 965 with fingerprint information stored in the terminal 900 to internally perform authentication in the terminal 900. When fingerprint information obtained from the partial fingerprint corresponds to fingerprint information stored in the terminal 900, it may be determined that local fingerprint authentication is successful, and when fingerprint information obtained from the partial fingerprint does not correspond to fingerprint information stored in the terminal 900, it may be determined that local fingerprint authentication is not successful. When collection of the fingerprint information required for local fingerprint authentication is insufficient, the process continues at operation 960 and the terminal 900 may request an additional fingerprint input, and when local fingerprint authentication is successful, the process continues at operation 975.

The terminal 900 selects a private key at operation 975. The terminal 900 may select a private key corresponding to the stored fingerprint information.

The terminal 900 may sign user information using the selected private key at operation 980. The terminal 900 may sign user information input at operation 955 using the selected private key.

The terminal 900 may transmit an authentication request to the server 940 at operation 985. The authentication request may include user information signed with the private key.

The server 940 may verify an authentication request received from the terminal 900 at operation 990. The server 940 may verify a signature of the terminal 900 using a public key received from and stored in the terminal 900. When the public key stored at the server 940 corresponds to a private key in which the terminal 900 uses for signing user information, it may be determined that signature verification is successful, and when the public key stored at the server 940 does not correspond to a private key in which the terminal 900 uses for signing user information, it may be determined that signature verification is not successful.

The server 940 transmits an authentication result to the terminal 900 at operation 995. When signature verification is successful, information indicating authentication success may be transmitted, and when signature verification is not successful, information indicating authentication failure may be transmitted.

In the embodiment of FIG. 9, when there is an additional authentication request, it is characterized in that the terminal 900 performs an authentication procedure by providing information signed using a key shared with the server 940 to the server 940 instead of performing authentication by transmitting fingerprint information to the server 940.

Figure 10:
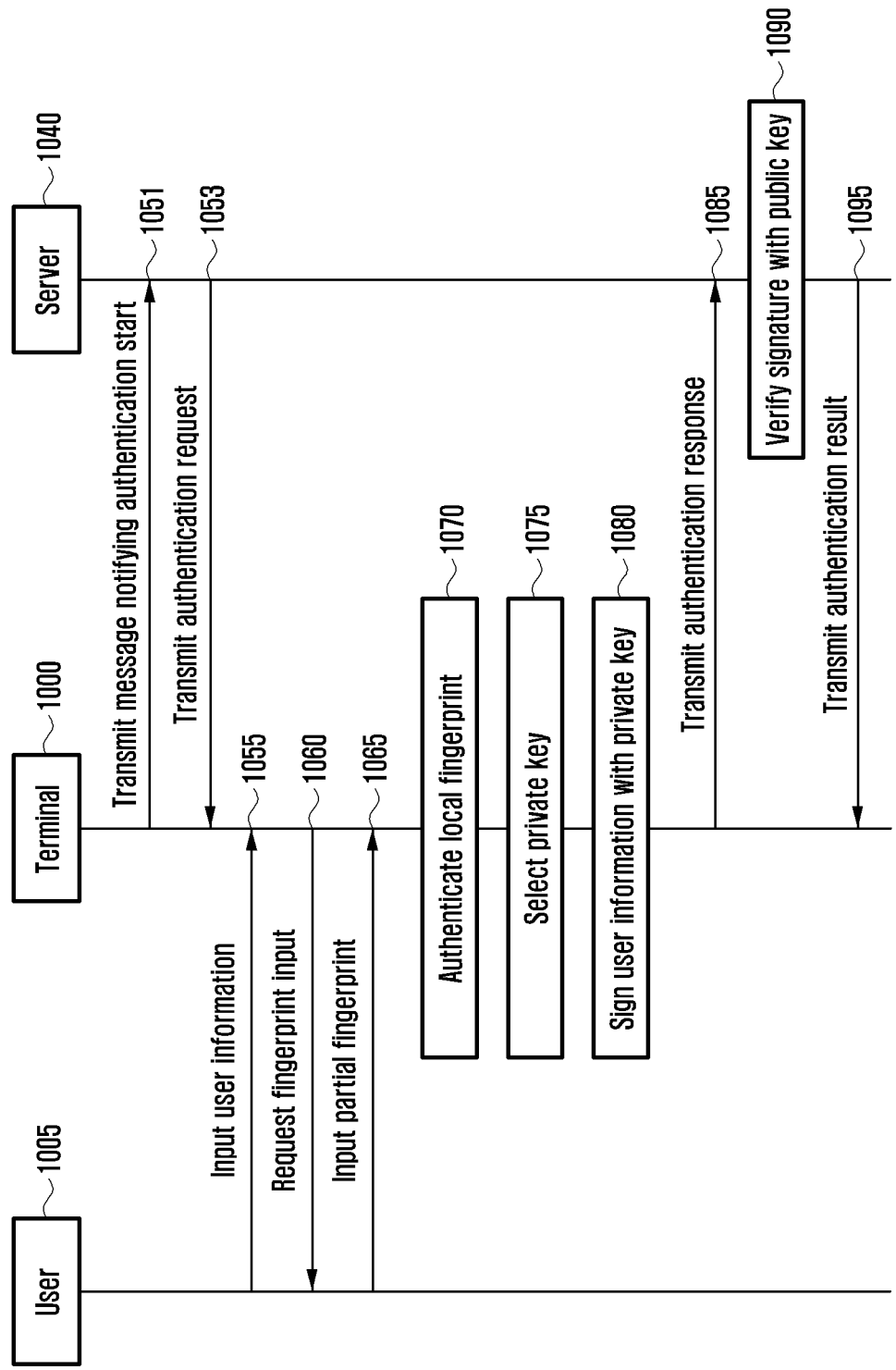
FIG. 10 is a message flow diagram illustrating a process of performing authentication based on partial fingerprint information and key information in a fifth embodiment of the disclosure.

FIG. 10 is a message flow diagram illustrating a process of performing authentication based on partial fingerprint information and key information in a fifth embodiment of the disclosure. FIG. 10 illustrates an extended embodiment of the embodiment of FIG. 9 and illustrates a method in which a terminal uses a challenge received from a server.

Referring to FIG. 10, a user 1005 is included and a terminal 1000 may transmit a message notifying the authentication start to a server 1040 at operation 1051. The server 1040 transmits an authentication request to the terminal 1000 at operation 1053. The authentication request may include information about the challenge and policy.

Operations 1055 to 1080 correspond to operations 955 to 980 of FIG. 9 and will be thus described in a description described with reference to FIG. 9.

The terminal 1000 transmits an authentication response to the server 1040 at operation 1085. The authentication response may include a challenge and user information signed with a private key.

The server 1040 may verify an authentication response received from the terminal 1000 at operation 1090. The server 1040 may verify a signature of the terminal 1000 using the public key received from and stored in the terminal 1000 and additionally verify whether the challenge provided at operation 1053 is included in the authentication response. When the authentication response includes the challenge and when a signature is verified by the public key stored at the server 1040, it may be determined that authentication is successful or otherwise, it may be determined that authentication is not successful.

The server 1040 may transmit an authentication result to the terminal 1000 at operation 1095. When the signature and challenge verification are succeeded, information indicating authentication success may be transmitted, and when the signature and challenge verification are failed, information indicating authentication failure may be transmitted.

Figure 11:
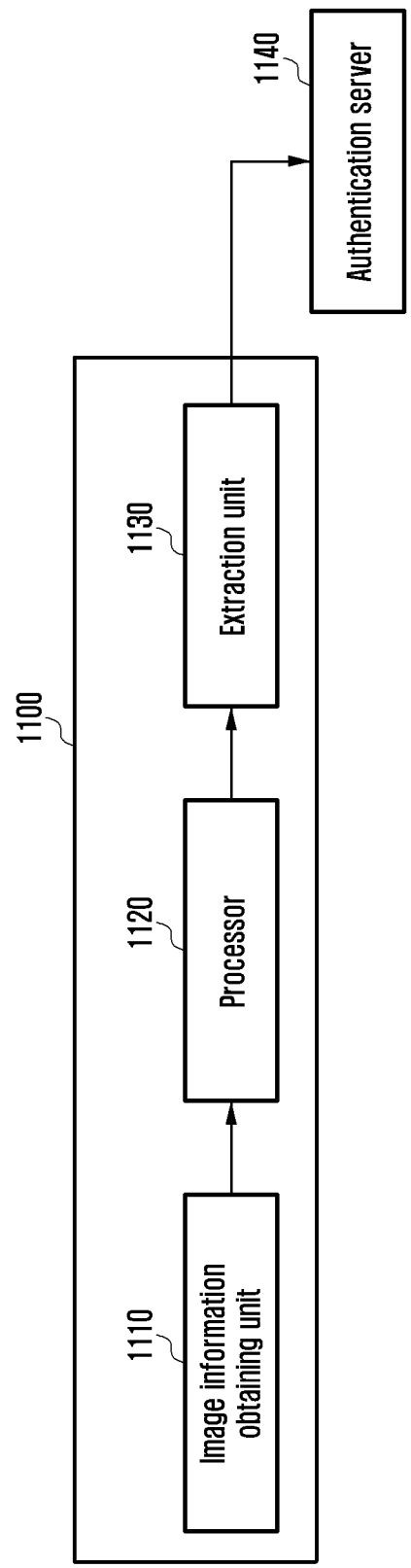
FIG. 11 is a block diagram illustrating a method of obtaining fingerprint information according to an embodiment of the disclosure.

FIG. 11 is a block diagram illustrating a method of obtaining fingerprint information according to an embodiment of the disclosure.

Referring to FIG. 11, a terminal 1100 may include an image information obtaining unit 1110 (or an image information obtaining processor), processor 1120, and extracting unit 1130 (or extracting processor). The image information obtaining unit 1110 obtains image information of a fingerprint and may be a camera of the terminal 1100. The camera may be a front camera or a rear camera. When lighting (or continuous light or instantaneous light) of the camera is used, a clear fingerprint may be obtained. The extracting unit 1130 may change a fingerprint image to information of a format that can authenticate. For example, the extracting unit 1130 may extract a position and shape of minutiae. The processor 1120 may process image information obtained by the image information obtaining unit 1110 to information that can use in the extracting unit 1130 and control the image information obtaining unit or control an application or user experience (UX) for obtaining fingerprint information using the image information obtaining unit 1110. When the processor 1120 processes image information, the processor 1120 may perform a function of extracting a finger from the image information and extracting a fingerprint area of the finger using the extraction unit 1130 and transmit it to an authentication server 1140.

In an embodiment described with reference to FIG. 11, in order for an application or an UX to efficiently obtain fingerprint information, the application or the UX may guide a fingerprint position, distance, and focus and induce a finger movement.

The above method of obtaining fingerprint information may be used as a method of obtaining fingerprint information in an embodiment of the disclosure described with reference to FIGS. 3 to 10.

Figure 12A:
FIGS. 12A, 12B, and 12C are diagrams illustrating a method of registering a fingerprint according to an embodiment of the disclosure.
Figure 12B:
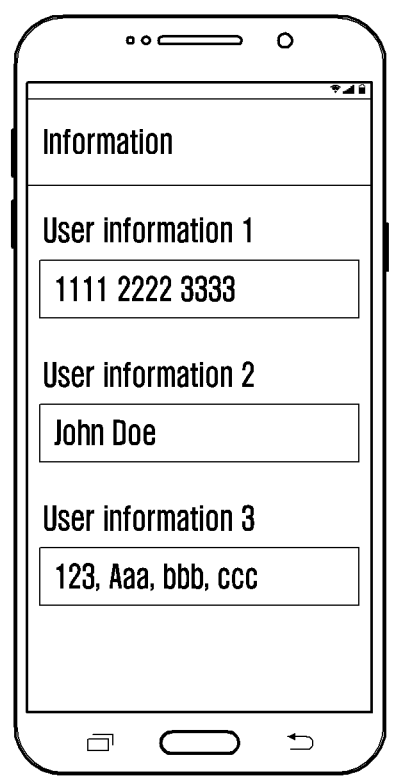
Figure 12C:

FIGS. 12A, 12B, and 12C are diagrams illustrating a method of registering a fingerprint according to an embodiment of the disclosure.

Referring to FIG. 12, because a smart phone uses an unlock function using a fingerprint, when a fingerprint for unlocking is registered in the terminal, a fingerprint for performing authentication with a server may be registered in parallel.

As shown in FIG. 12A, in a page that registers a fingerprint for unlocking, a menu for activating an online authentication service may be added. When a menu for activating an online authentication service is turned on, a fingerprint for performing authentication with a server together with fingerprint registration for unlocking may be registered in parallel. When a menu for activating an online authentication service is turned off, only fingerprint registration for unlocking may be performed.

When a menu for activating an online authentication service is turned on, as shown in FIG. 12B, a user information input window may be displayed. At least one user information for connecting with and using fingerprint information may be input.

As shown in FIG. 12C, a user fingerprint may be input to the terminal. When a user partial fingerprint is input, the terminal may generate combination fingerprint information or full fingerprint information for performing authentication with the server by stitching the partial fingerprint. An operation after generating a combination fingerprint has been described with reference to FIGS. 3 to 10.

When only one of fingerprint registration for unlocking and fingerprint registration for performing authentication with the server is complete, a fingerprint registration procedure for a service that is not complete may be continued.

An exclusive application for using fingerprint authentication with a server may be used instead of a procedure of registering a fingerprint for unlocking of the terminal. When the exclusive application is started, a field for inputting user information may be displayed, and after user information is input, partial fingerprint information may be input. The order of inputting user information and the order of inputting a fingerprint may be performed in reverse. After partial fingerprint information is used with the exclusive application, a procedure of performing authentication with the server by performing stitching has been described with reference to FIGS. 3 to 10.

In each embodiment of the disclosure, when local partial fingerprint authentication is performed, the number of times that perform local partial authentication may be determined based on a false accept ratio (FAR). For example, when a FAR required by a server is 0.01 and when partial fingerprint authentication is performed according to a sensor of the terminal, if a FAR is 0.02 k, k may be greater than n. In this case, local partial fingerprint authentication of one time deviates from a reference of a FAR required by the server. When partial fingerprint authentication of different portions is performed by n times, a FAR is reduced to $(0.002)n$. Therefore, different partial fingerprints may be input based on a FAR required by the server. Different partial fingerprints may include a change of a finger that inputs a partial fingerprint or an input of different fingerprint information while a position of a finger is moved.

Figure 13:
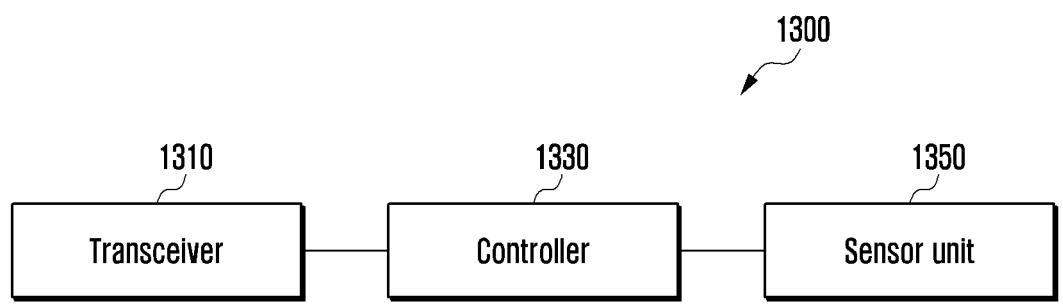
FIG. 13 is a block diagram illustrating a configuration of a terminal according to an embodiment of the disclosure.

FIG. 13 is a block diagram illustrating a configuration of a terminal according to an embodiment of the disclosure.

Referring to FIG. 13, a terminal 1300 may include a transceiver 1310, a controller 1330, and a sensor unit 1350 (or at least one sensor). The terminal 1300 may further include an image information obtaining unit (or an image information obtaining processor) and a storage unit (or a storage unit). The controller 1330 may include at least one processor. The transceiver 1310 may transmit and/or receive a signal, information, and a message. The terminal 1300 may communicate with the server using the transceiver 1310.

The controller 1330 may control operations of a stitching unit, extracting unit, authentication unit, and processor described in the embodiments of the disclosure.

According to an embodiment of the disclosure, the controller 1330 may control a sensor that obtains first partial fingerprint information and second partial fingerprint information, control the transceiver 1310 to generate combination fingerprint information based on the first partial fingerprint information and the second partial fingerprint information and to transmit the combination fingerprint information to the server, and control the transceiver 1310 to receive an authentication result of the combination fingerprint information from the server.

When an authentication result is an authentication success, the controller 1330 may control to store the combination fingerprint information in the terminal. The combination fingerprint information may be at least one of image information that connects the first partial fingerprint information and the second partial fingerprint information and information about a position and shape of minutiae extracted from the image information.

The controller 1330 may determine whether the combination fingerprint information satisfies a predetermined condition, and if the combination fingerprint information satisfies a predetermined condition, the controller 1330 may control to transmit the combination fingerprint information to the server. If the combination fingerprint information does not satisfy a predetermined condition, the controller 1330 may control to obtain additional partial fingerprint information.

The controller 1330 may obtain third partial fingerprint information and perform local fingerprint authentication based on the stored combination fingerprint information and the third partial fingerprint information, and when the local fingerprint authentication is successful, the controller 1330 may control the transceiver 1310 to transmit an authentication request message including the stored combination fingerprint information to the server.

Further, the controller 1330 may generate a public key and a private key corresponding to the combination fingerprint information succeeded in the authentication and control the transceiver 1310 to transmit the public key to the server.

Further, the controller 1330 may obtain third partial fingerprint information and perform local fingerprint authentication based on the stored combination fingerprint information and the third partial fingerprint information, and when local fingerprint authentication is successful, the controller 1330 may control the transceiver 1310 to transmit an authentication request message including user information signed by the private key to the server.

An operation of the terminal 1300 is not limited to an operation of FIG. 13 but includes all operations of the terminal described with reference to FIGS. 1 to 12, and the controller 1330 may control operations of the terminal described with reference to FIGS. 1 to 12.

Figure 14:
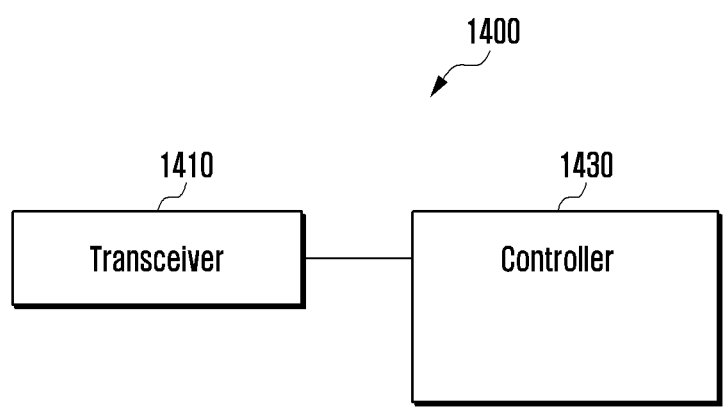
FIG. 14 is a block diagram illustrating a configuration of an authentication server according to an embodiment of the disclosure.

FIG. 14 is a block diagram illustrating a configuration of an authentication server according to an embodiment of the disclosure.

Referring to FIG. 14, an authentication server 1400 includes a transceiver 1410 and a controller 1430. The authentication server 1400 may further include a storing unit. The transceiver 1410 may transmit and/or receive a signal, information, and a message. The authentication server 1400 may perform communication with the terminal and a biometric recognition database through the transceiver 1410. The controller 1430 may control an operation of the authentication server 1400. The controller 1430 may include at least one processor.

According to an embodiment of the disclosure, the controller 1430 may control the transceiver 1410 to receive an authentication request including user information and combination fingerprint information generated based on at least two partial fingerprint information, to perform authentication based on reference fingerprint information corresponding to the user information and combination fingerprint information received from the terminal, and the transceiver 1410 to transmit an authentication result to the terminal.

Further, when the authentication result is an authentication success, the controller 1430 may the transceiver 1410 to receive a public key corresponding to the combination fingerprint information from the terminal, to store the public key, and control the transceiver 1410 to receive an additional authentication request including user information signed by a secret key from the terminal, and to verify user information signed by the secret key based on the public key.

An operation of the authentication server 1400 is not limited to the operation of FIG. 14 but may include all operations of the authentication server described with reference to FIGS. 1 to 12, and the controller 1430 may control operations of the authentication server described with reference to FIGS. 1 to 12.

Embodiments of the disclosure may be used as a means for user authentication in a financial service, various login services, a social network service (SNS), a closed information access service, and profile download in an eUICC.

According to an embodiment of the disclosure, an authentication method, apparatus, and system based on biometric information can be provided.

According to an embodiment of the disclosure, a method, apparatus, and system that authenticate a user or user information using some of biometric information (e.g., fingerprint information) can be provided.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating a terminal, the method comprising:
   obtaining first partial fingerprint information;
   obtaining second partial fingerprint information;
   generating combination fingerprint information based on the first partial fingerprint information and the second partial fingerprint information;
   determining whether the combination fingerprint information satisfies a predetermined condition;
   transmitting the combination fingerprint information to a server in case that the combination fingerprint information satisfies the predetermined condition;
   obtaining, in case that the combination fingerprint information does not satisfy the predetermined condition, additional partial fingerprint information; and
   receiving an authentication result of the combination fingerprint information from the server.

2. The method of claim 1, further comprising storing, if the authentication result is an authentication success, the combination fingerprint information in the terminal.

3. The method of claim 2, further comprising:
   obtaining third partial fingerprint information;
   performing local fingerprint authentication based on the stored combination fingerprint information and the third partial fingerprint information; and
   transmitting, if the local fingerprint authentication is successful, an authentication request message comprising the stored combination fingerprint information to the server.

4. The method of claim 2, further comprising:
   if the authentication result is the authentication success, generating a public key and a private key corresponding to the combination fingerprint information; and
   transmitting the public key to the server.

5. The method of claim 4, further comprising:
   obtaining third partial fingerprint information;
   performing local fingerprint authentication based on the stored combination fingerprint information and the third partial fingerprint information; and
   transmitting, if the local fingerprint authentication is successful, an authentication request message including user information signed with the private key to the server.

6. The method of claim 1, wherein the combination fingerprint information includes at least one of:
   image information connecting the first partial fingerprint information and the second partial fingerprint information, or
   information about a position and a shape of minutiae extracted from the image information.

7. At least one non-transitory computer readable storage medium for storing a computer program of instructions configured to be readable by at least one processor for instructing the at least one processor to execute a computer process for performing the method of claim 1.

8. A method of operating a server, the method comprising:
   receiving an authentication request message including user information and combination fingerprint information generated based on at least two partial fingerprint information;
   performing authentication based on reference fingerprint information corresponding to the user information and the combination fingerprint information received from a terminal;
   transmitting an authentication result to the terminal;
   receiving, if the authentication result is an authentication success, a public key corresponding to the combination fingerprint information from the terminal; and
   storing the public key.

9. The method of claim 8, further comprising:
   receiving an additional authentication request message including user information signed by a secret key from the terminal; and
   verifying the user information signed by the secret key based on the public key.

10. A terminal comprising:
    a transceiver;
    a sensor configured to obtain first partial fingerprint information and second partial fingerprint information; and
    a controller configured to:
       generate combination fingerprint information based on the first partial fingerprint information and the second partial fingerprint information,
       determine whether the combination fingerprint information satisfies a predetermined condition,
       transmit, via the transceiver, the combination fingerprint information to a server in case that the combination fingerprint information satisfies the predetermined condition,
       receive, via the transceiver, an authentication result of the combination fingerprint information from the server, and
       control the sensor to obtain, in case that the combination fingerprint information does not satisfy the predetermined condition, additional partial fingerprint information.

11. The terminal of claim 10, wherein the controller is further configured to store the combination fingerprint information in the terminal, if the authentication result is an authentication success.

12. The terminal of claim 11, wherein the controller is further configured to:
    obtain third partial fingerprint information,
    perform local fingerprint authentication based on the stored combination fingerprint information and the third partial fingerprint information, and
    control the transceiver to transmit an authentication request message including the stored combination fingerprint information to the server, if the local fingerprint authentication is successful.

13. The terminal of claim 11, wherein the controller is further configured to:
generate a public key and a private key corresponding to the combination fingerprint information if the authentication result is the authentication success, and
transmit, via the transceiver, the public key to the server.

14. The terminal of claim 10, wherein the combination fingerprint information includes at least one of:
image information connecting the first partial fingerprint information and the second partial fingerprint information, or
information about a position and a shape of minutiae extracted from the image information.

15. A server comprising:
a transceiver; and
a controller configured to:
receive, via the transceiver, an authentication request message including user information and combination fingerprint information generated based on at least two partial fingerprint information,
perform authentication based on reference fingerprint information corresponding to the user information and the combination fingerprint information received from a terminal,
transmit, via the transceiver, an authentication result to the terminal,
receive, if the authentication result is an authentication success, a public key corresponding to the combination fingerprint information from the terminal, and
store the public key.

16. The server of claim 15, wherein the controller is further configured to:
receive, via the transceiver, an additional authentication request message including user information signed by a secret key from the terminal, and
verify the user information signed by the secret key based on the public key.

* * * * *